Patented Feb. 15, 1938

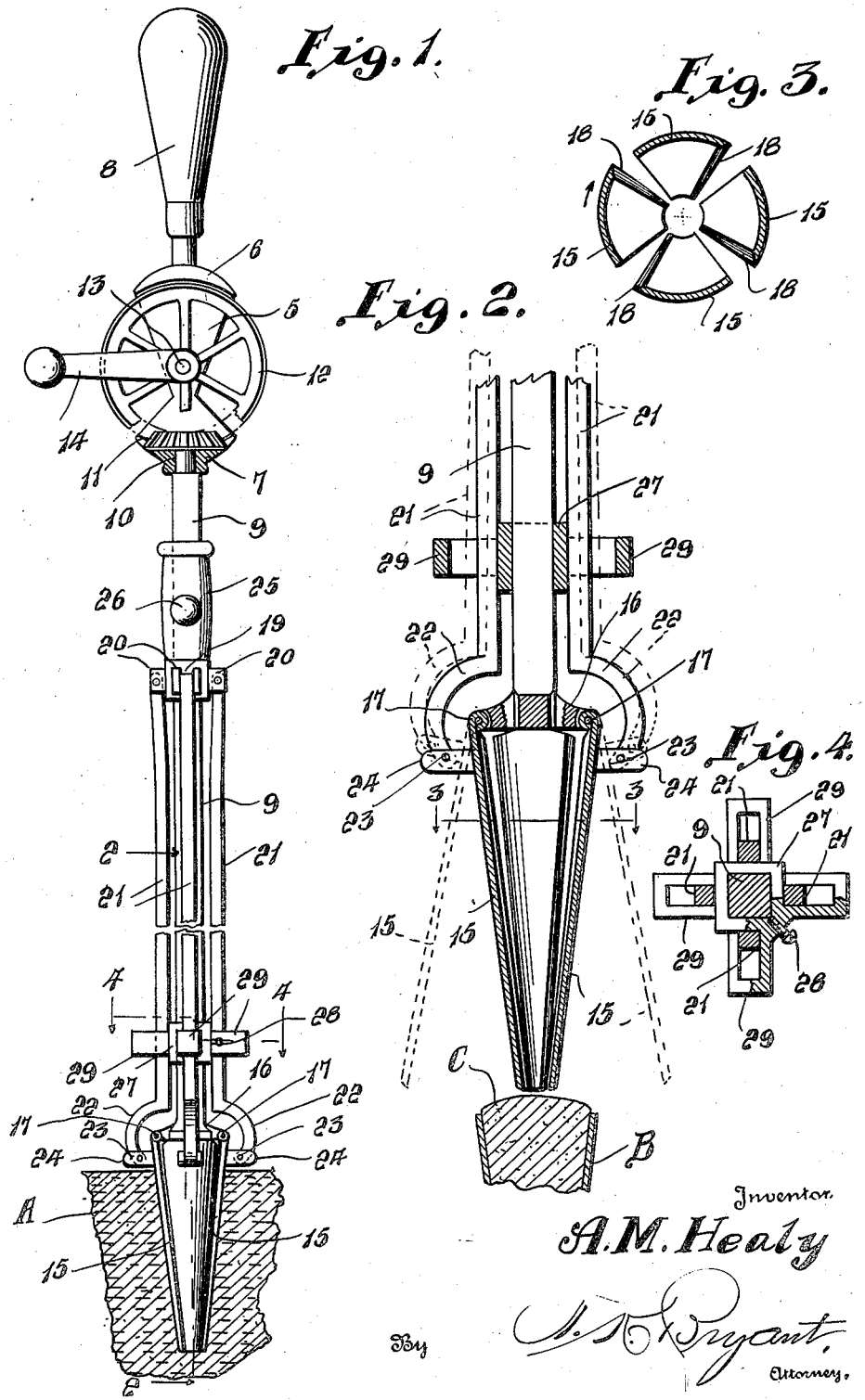
Feb. 15, 1938. A. M. HEALY 2,108,585
ICE CREAM DIPPER AND MOLD
Filed April 14, 1937

2,108,585

UNITED STATES PATENT OFFICE 2,108,585

ICE CREAM DIPPER AND MOLD

Andrew M. Healy, Streator, Ill.

Application April 14, 1937, Serial No. 136,895

5 Claims. (Cl. 107—48)

This invention relates to ice cream dippers and molds.

The primary object of the invention is to provide an ice cream dipper and mold wherein a dipper of any preferred design is adapted to be forced into a mass of ice cream or other similar material and upon rotation thereof while in the ice cream to have the latter fed therein and to be molded thereby, the dipper after removal from the mass of ice cream adapted to be opened for the release of the molded ice cream.

A further object of the invention is to provide a dipper and mold of the foregoing character wherein the dipper is of cone-shape and formed of longitudinally extending sections with a knife edge on each section to cause ice cream to be cut from a mass and delivered into the dipper upon rotation of the latter in the ice cream with means for separating the sections of the dipper and the discharge of the molded cone of ice cream into a cone shaped edible carrier.

With the above and other objects in view that will become apparent as the nature of the invention is better understood, the same consists in the novel form, combination and arrangement of parts hereinafter more fully described, shown in the accompaying drawing and claimed.

In the accompanying drawing,

Figure 1 is a side elevational view, partly broken away and shown in section of an ice cream dipper and mold constructed in accordance with the present invention, the dipper being illustrated as immersed in a mass of ice cream, Figure 2 is an enlarged detail sectional view taken on line 2—2 of Figure 1 with an edible ice cream container, such as a cake cone with a cone of ice cream therein fragmentarily illustrated below the scoop and mold with the sections or segments of the scoop and operating arms therefor shown by dotted lines in their releasing positions, Figure 3 is a cross sectional view taken on line 3—3 of Figure 2 showing the segment construction of the ice cream dipper and mold with the leading edges of the segments sharpened, and Figure 4 is a cross sectional view taken on line 4—4 of Figure 1, showing the adjustable guide upon the shank of the device for limiting opening movements of the scoop segments.

The ice cream dipper and mold comprises a head or body portion illustrated in Figure 1 as being formed of a pair of side plates 5 connected at their upper ends by a bridge piece 6 and further connected at their lower ends by a bearing block 7. A hand grip or handle 8 extends upwardly from the bridge piece 6.

An elongated shank 9 of polygonal form in cross section as shown in Figure 4 has the cylindrical portion 10 at its upper end journaled in the bearing 7 with a beveled pinion 11 fixed to the upper end of the cylindrical portion 10 of the shank above the bearing 7 and between the side plates 5 of the body to be engaged by beveled gear wheel 12 fixed to a shaft 13 journaled in the side plates 5 of the body with a crank handle 14 fixed to the shaft to effect rotation of the beveled gear 12 and the pinion 11 meshing therewith together with the shank 9.

An ice cream dipper and mold is carried by the lower end of the elongated shank 9 and while the dipper and mold may be of any configuration desired, the same is illustrated as being of cone shape and embodies any number of elongated sections or segments 15, four of such segments being shown that are arcuate in cross section and tapered towards the lower end of the dipper. A head 16 is formed at the lower end of the shank 19 and the upper end of the dipper segments 15 are pivotally mounted on the head as at 17. As shown in Figure 3, the leading edge of each segment 15 is sharpened as at 18, the direction of rotation of the dipper being indicated by an arrow line for feeding ice cream into the dipper for molding the same into cone shape.

Means is provided for opening and closing the segment 15 of the scoop and includes a rectangular collar 19 slidable upon the elongated shank 9 and having pairs of diametrically opposite outwardly projecting ears 20 for the pivotal support of the upper ends of elongated arms 21 directed towards the scoop with the outer ends of the arms 21 outwardly arched as at 22 for pivotal attachment as at 23 respectively with an outwardly directed finger 24 carried by the upper end of each segment 15 at a point below the pivotal mounting of the segment upon the head 16 at the lower end of the shank 9. A hand grip 25 on the upper end of the shank 9 is rigid with the rectangular collar 19 and carries a set screw 26 for holding the hand grip 25 and collar 19 against the movements on the shank 9 and through the medium of the arms 21 acting to hold the scoop segments 15 in their closed position.

Means is provided for limiting the opening movements of the scoop segments 15 and includes a rectangular collar 27 longitudinally adjustable upon the shank 9 and retained in adjusted positions by the set screw 28, pairs of outwardly directed diametrically opposite slotted guides 29 being carried by the rectangular collar 27 and to which guides the elongated arms 21 respectively extend. To fill the scoop with ice cream, the scoop segments 15 are retained in their closed position by tightening the set screw 26 carried by the hand grip 25 upon the shank 9, the scoop being then dipped into a mass of ice cream A as shown in Figure 1, the handle 8 being gripped by one hand while the shank 9 carrying the scoop is rotated through the medium of the hand driven bevel gear 12 and pinion 11 meshing therewith. The cutting edges 18 on the scoop segments 15 cause the scoop to be filled with ice cream and when the scoop is filled, the same is withdrawn from the mass of ice cream A and held above a receptacle to receive the molded ice cream, such as an edible cone B fragmentarily illustrated in Figure 2. Upon releasing the set screw 26, the hand grip 25 is slid along the shank 9 toward the hand grip 8, this movement causing the arms 21 to move the screw segments 15 upon their pivotal mountings at the lower end of the shank 9 to the dotted line position shown in Figure 2 and at which time the molded ice cream cone C is delivered to the edible cone B. By adjusting the collar 27 along the shank 9, outward movement of the arms 21 to effect opening of the scoop segments 15 may be varied. Also, the shank 9 and associated parts are of a length to permit easy removal of the entire body of ice cream A from a container or can, especially when working toward the bottom of the latter.

From the above detailed description of the invention, it is believed that the construction and operation thereof will be at once apparent, and while there are herein shown and described the preferred embodiments of the invention, it is nevertheless to be understood that minor changes may be made therein without departing from the spirit and scope of the invention as claimed.

I claim:—

1. In an ice cream dipper and mold, an elongated shank, a scoop at the outer end thereof formed of sections hinged at their inner ends to the outer end of the shank, means slidable on the shank and engaged with the sections of the scoop for opening and closing the scoop sections, and means for anchoring the slidable means to the shank for holding the scoop sections in closed positions.

2. In an ice cream dipper and mold, an elongated shank, a scoop at the outer end thereof formed of sections hinged at their inner ends to the outer end of the shank, means slidable on the shank and engaged with the sections of the scoop for opening and closing the scoop sections, the scoop sections when closed having their meeting edges slightly spaced with corresponding edges of the sections sharpened, and means for rotating the scoop to cause the sharpened edges to cut ice cream from a mass and feed the same into the scoop.

3. In an ice cream dipper and mold, an elongated shank, a scoop at the outer end thereof formed of sections hinged at their inner ends to the outer end of the shank, means slidable on the shank and engaged with the sections of the scoop for opening and closing the scoop sections, the scoop sections when closed having their meeting edges slightly spaced with corresponding edges of the sections sharpened, means for rotating the scoop to cause the sharpened edges to cut ice cream from a mass and feed the same into the scoop, including a body support in which the upper end of the shank is journalled, a bevelled pinion on the upper end of the shank and a hand operated bevelled gear meshing with said pinion.

4. In an ice cream dipper and mold, an elongated shank, a scoop at the outer end thereof formed of sections hinged at their inner ends to the outer end of the shank, means slidable on the shank and engaged with the sections of the scoop for opening and closing the scoop sections, the scoop sections when closed having their meeting edges slightly spaced with corresponding edges of the sections sharpened, means for rotating the scoop to cause the sharpened edges to cut ice cream from a mass and feed the same into the scoop, the slidable means on the shank including a head, a hand grip carried by the upper end of the head, elongated arms respectively pivoted at their lower ends to the upper ends of the scoop sections below the hinge connections with the shank, and pivoted at their upper ends to said head and a guide device longitudinally adjustable on the shank and through which the arms extend for limiting outward swinging movements of the lower ends of the arms and opening movements of the scoop sections.

5. In an ice cream dipper and mold, an elongated shank, a scoop at the outer end thereof formed of sections hinged at their inner ends to the outer end of the shank, means slidable on the shank and engaged with the sections of the scoop for opening and closing the scoop sections, the scoop sections when closed having their meeting edges slightly spaced with corresponding edges of the sections sharpened, means for rotating the scoop to cause the sharpened edges to cut ice cream from a mass and feed the same into the scoop, including a body support in which the upper end of the shank is journalled, a bevelled pinion on the upper end of the shank and a hand operated bevelled gear meshing with said pinion, the slidable means on the shank including a head, a hand grip carried by the upper end of the head, elongated arms respectively pivoted at their lower ends to the upper ends of the scoop sections below the hinge connections with the shank, and pivoted at their upper ends to said head and a guide device longitudinally adjustable on the shank and through which the arms extend for limiting outward swinging movements of the lower ends of the arms and opening movements of the scoop sections.

ANDREW M. HEALY.